(12) United States Patent
Kim et al.

(10) Patent No.: US 12,454,240 B1
(45) Date of Patent: Oct. 28, 2025

(54) ROOF RAIL AIRBAG SYSTEM

(71) Applicant: GM GLOBAL TECHNOLOGY OPERATIONS LLC, Detroit, MI (US)

(72) Inventors: Byunggu Kim, Gangdong-gu (KR); Junbum Lee, Gwangmyeong-si (KR); Gumhwan Lee, Bucheon-si (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/971,263

(22) Filed: Dec. 6, 2024

(51) Int. Cl.
| | |
|---|---|
| *B60R 21/213* | (2011.01) |
| *B60R 21/21* | (2011.01) |
| *B60R 21/231* | (2011.01) |
| *B60R 21/264* | (2006.01) |

(52) U.S. Cl.
CPC .......... *B60R 21/213* (2013.01); *B60R 21/21* (2013.01); *B60R 21/264* (2013.01); *B60R 2021/23192* (2013.01)

(58) Field of Classification Search
CPC ..... B60R 21/213; B60R 21/21; B60R 21/264; B60R 2021/23192; B60R 21/214; B60R 2021/23138; B60R 21/232
See application file for complete search history.

(56) References Cited

U.S. PATENT DOCUMENTS

| | | | | |
|---|---|---|---|---|
| 5,775,726 A | * | 7/1998 | Timothy | B60R 13/0212 |
| | | | | 280/730.1 |
| 6,123,355 A | * | 9/2000 | Sutherland | B60R 21/232 |
| | | | | 280/736 |
| 6,457,740 B1 | * | 10/2002 | Vaidyaraman | B60R 21/232 |
| | | | | 280/730.2 |
| 6,481,743 B1 | * | 11/2002 | Tobe | B60R 21/232 |
| | | | | 280/730.2 |
| 7,390,016 B2 | * | 6/2008 | Noguchi | B60R 21/232 |
| | | | | 280/730.2 |
| 8,231,138 B2 | * | 7/2012 | Sadr | B60R 21/235 |
| | | | | 280/730.2 |

(Continued)

FOREIGN PATENT DOCUMENTS

| | | |
|---|---|---|
| DE | 10039802 A1 | 2/2002 |
| DE | 69917701 T2 | 7/2004 |

OTHER PUBLICATIONS

German Office Action for German Application No. 102025101799.9; dated Jul. 31, 2025; 6 pages.

*Primary Examiner* — Paul N Dickson
*Assistant Examiner* — Tiffany L Webb
(74) *Attorney, Agent, or Firm* — CANTOR COLBURN LLP

(57) ABSTRACT

A roof rail airbag system of a vehicle includes a side cushion airbag, a roof cushion airbag, and an inflator operably connected to both the side cushion airbag and the roof cushion airbag and configured to inflate both the side cushion airbag and the roof cushion airbag. A method of operating a roof rail airbag system of a vehicle includes inflating a side cushion airbag of the roof rail airbag system via an inflator operably connected thereto, and inflating a roof cushion airbag of the roof rail airbag system via the same inflator. The roof cushion airbag is configured, when inflated, to extend across a roof of the vehicle between a roof panel and a headliner of the vehicle, the side cushion airbag is configured, when inflated, to extend across a side window of an occupant compartment of the vehicle.

14 Claims, 4 Drawing Sheets

(56) References Cited

U.S. PATENT DOCUMENTS

| | | | |
|---|---|---|---|
| 9,016,717 B1 * | 4/2015 | Clauser | B60R 21/2338 |
| | | | 280/729 |
| 9,085,275 B2 * | 7/2015 | Sadr | B60N 2/914 |
| 9,610,915 B2 * | 4/2017 | Specht | B60R 21/233 |
| 10,315,609 B2 * | 6/2019 | Thomas | B60R 21/261 |
| 11,046,281 B2 | 6/2021 | Yoo | |
| 11,597,344 B2 * | 3/2023 | Lee | B60R 21/233 |

* cited by examiner

ROOF RAIL AIRBAG SYSTEM

The subject disclosure relates to vehicles, and in particular to airbag systems of vehicles.

Vehicles utilize airbag systems to improve the safety of vehicle occupants in the event of a collision. These may include, but are not limited to front airbag systems, seat airbag systems and roof rail airbag systems. The roof rail airbag systems, in particular, are mounted in the roof portion of the vehicle body and include a side cushion airbag configured to protect the head, neck, and upper torso area of the occupant from injury.

With increased popularity, in particular, of vehicles with fixed translucent or glass roof configurations, it is desired to expand protection of the occupant in the case of a vehicle rollover event.

SUMMARY

In one exemplary embodiment, a roof rail airbag system of a vehicle includes a side cushion airbag, a roof cushion airbag, and an inflator operably connected to both the side cushion airbag and the roof cushion airbag and configured to inflate both the side cushion airbag and the roof cushion airbag.

In addition to one or more of the features described herein a Y-valve connects the inflator to the side cushion airbag and the roof cushion airbag.

In addition to one or more of the features described herein the side cushion airbag, the roof cushion airbag and the Y-valve are formed together as a single unitary component.

In addition to one or more of the features described herein a first inflation rate of the roof cushion airbag is different from a second inflation rate of the side cushion airbag.

In addition to one or more of the features described herein the roof cushion airbag is configured, when inflated, to extend across a roof of the vehicle between a roof panel and a headliner of the vehicle.

In addition to one or more of the features described herein the roof cushion airbag is configured, when inflated, to extend between 25% and 75% of a roof panel width across the roof panel.

In addition to one or more of the features described herein the side cushion airbag is configured, when inflated, to extend across a side window of an occupant compartment of the vehicle.

In addition to one or more of the features described herein the roof rail airbag system is configured to be secured to a roof rail of the vehicle.

In another exemplary embodiment, a vehicle includes a vehicle body defining an occupant compartment, and a roof rail airbag system secured to the vehicle body in the occupant compartment. The roof rail airbag system includes a side cushion airbag, a roof cushion airbag, and an inflator operably connected to both the side cushion airbag and the roof cushion airbag and configured to inflate both the side cushion airbag and the roof cushion airbag.

In addition to one or more of the features described herein a Y-valve connects the inflator to the side cushion airbag and the roof cushion airbag.

In addition to one or more of the features described herein the side cushion airbag, the roof cushion airbag and the Y-valve are formed together as a single unitary component.

In addition to one or more of the features described herein a first inflation rate of the roof cushion airbag is different from a second inflation rate of the side cushion airbag.

In addition to one or more of the features described herein the roof cushion airbag is configured, when inflated, to extend across a roof of the vehicle between a roof panel and a headliner of the vehicle.

In addition to one or more of the features described herein the roof cushion airbag is configured, when inflated, to extend between 25% and 75% of a roof panel width across the roof panel.

In addition to one or more of the features described herein the side cushion airbag is configured, when inflated, to extend across a side window of an occupant compartment of the vehicle.

In addition to one or more of the features described herein the roof rail airbag system is secured to a roof rail of the vehicle.

In yet another exemplary embodiment, a method of operating a roof rail airbag system of a vehicle includes inflating a side cushion airbag of the roof rail airbag system via an inflator operably connected thereto, and inflating a roof cushion airbag of the roof rail airbag system via the same inflator. The roof cushion airbag is configured, when inflated, to extend across a roof of the vehicle between a roof panel and a headliner of the vehicle, the side cushion airbag is configured, when inflated, to extend across a side window of an occupant compartment of the vehicle.

In addition to one or more of the features described herein a first inflation rate of the roof cushion airbag is different from a second inflation rate of the side cushion airbag.

In addition to one or more of the features described herein the inflator is operably connected to the side cushion airbag and the roof cushion airbag via a Y-valve.

In addition to one or more of the features described herein the side cushion airbag, the roof cushion airbag and the Y-valve are formed together as a single unitary component.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
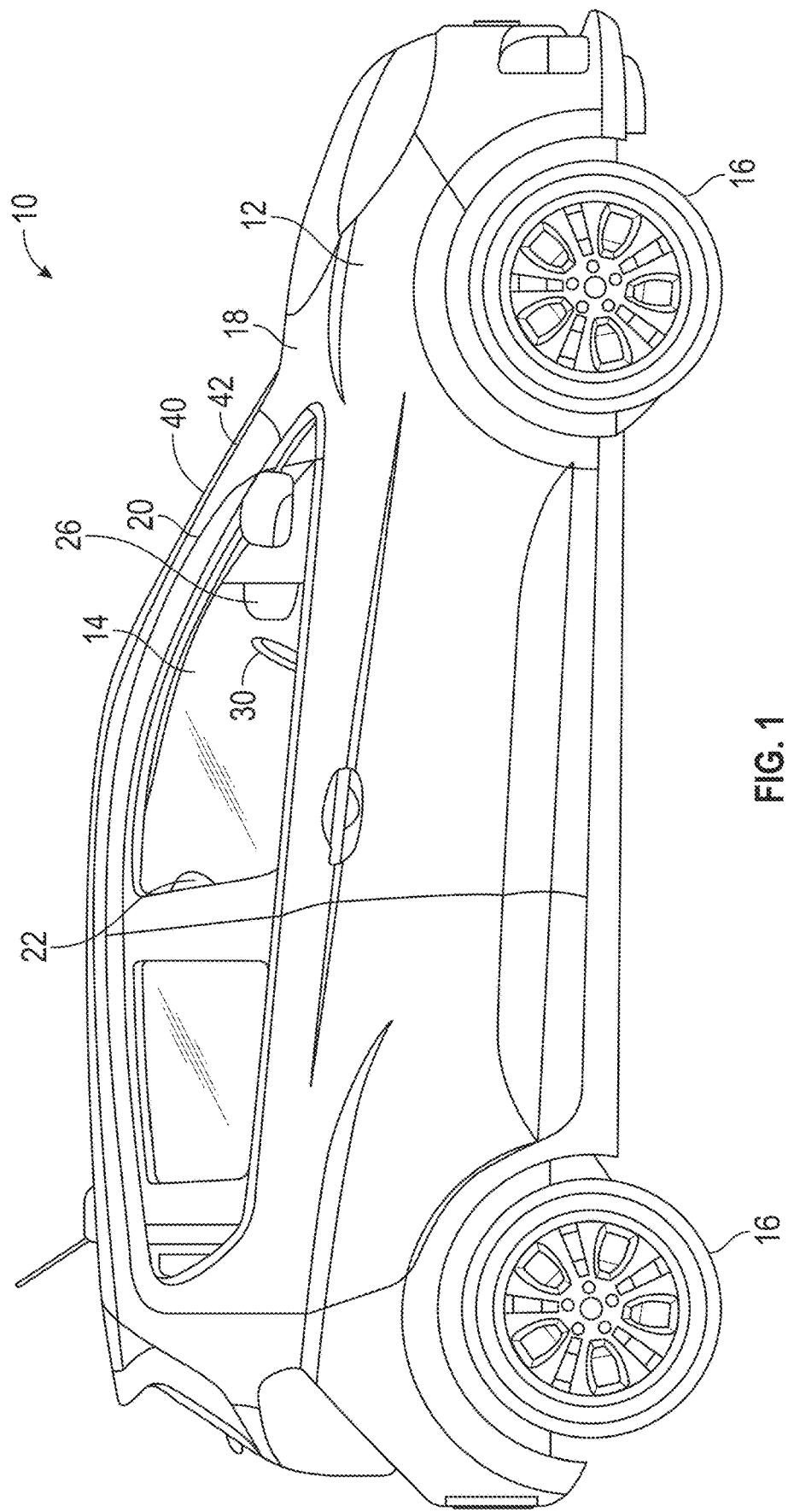
FIG. 1 is a schematic illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment a vehicle, in accordance with a non-limiting example, is indicated generally at 10 in FIG. 1. Vehicle 10 includes a body 12 supported on a plurality of wheels 16. In a non-limiting example, two of the plurality of wheels 16 are steerable. Body 12 defines, in part, an occupant compartment 14 having seats 22 positioned behind a dashboard 26. A steering control 30 is arranged between seats 22 and dashboard 26. Steering control 30 is operated to control orientation of the steerable wheel(s) 16.

Figure 2:
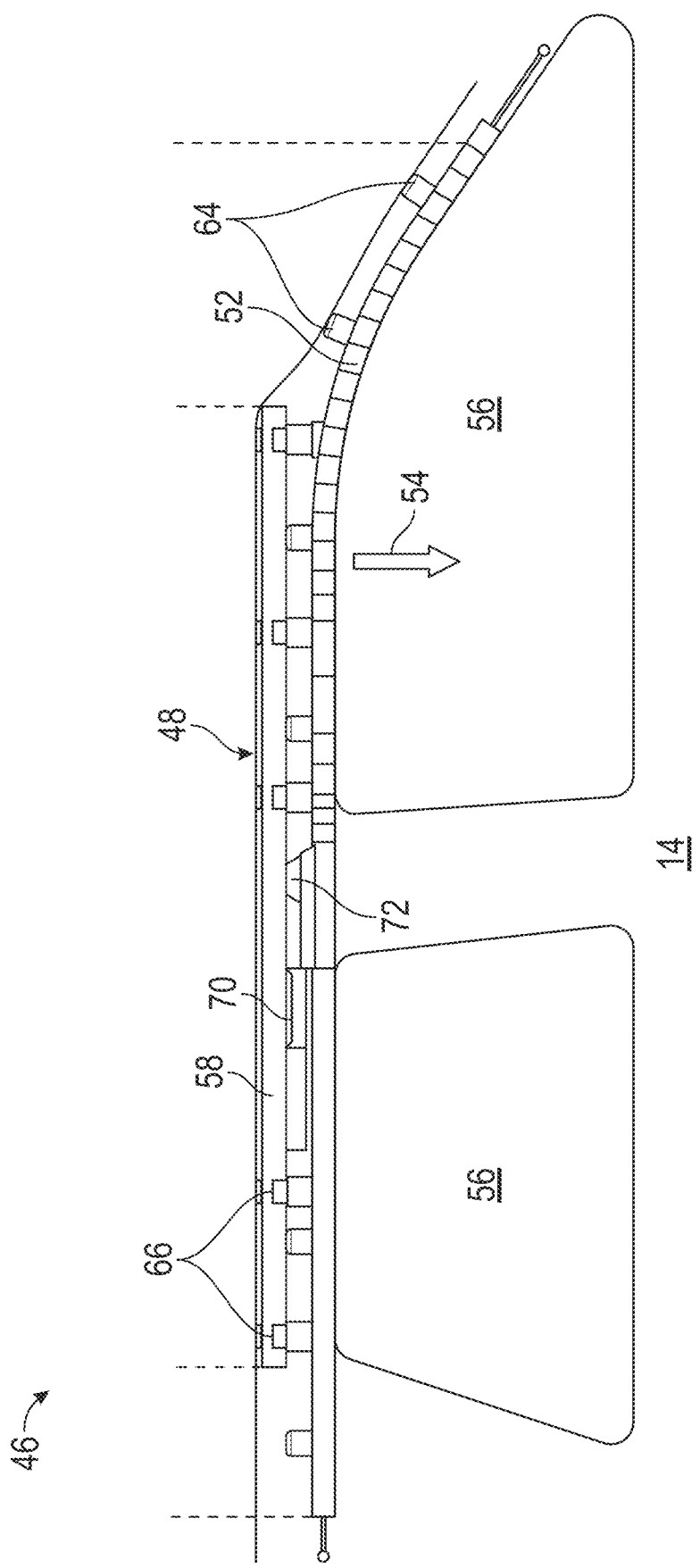
FIG. 2 is a partial cross-sectional view of an embodiment of an occupant compartment of a vehicle.

Referring now to FIG. 2, illustrated is a partial cross-sectional view of an embodiment of an occupant compartment 14. The occupant compartment 14 includes one or more inflatable protective devices, also known as airbags, which includes one or more roof rail airbag (RRAB) systems 46 extending at least partially along a roof rail 48 of the body 12.

Figure 3:
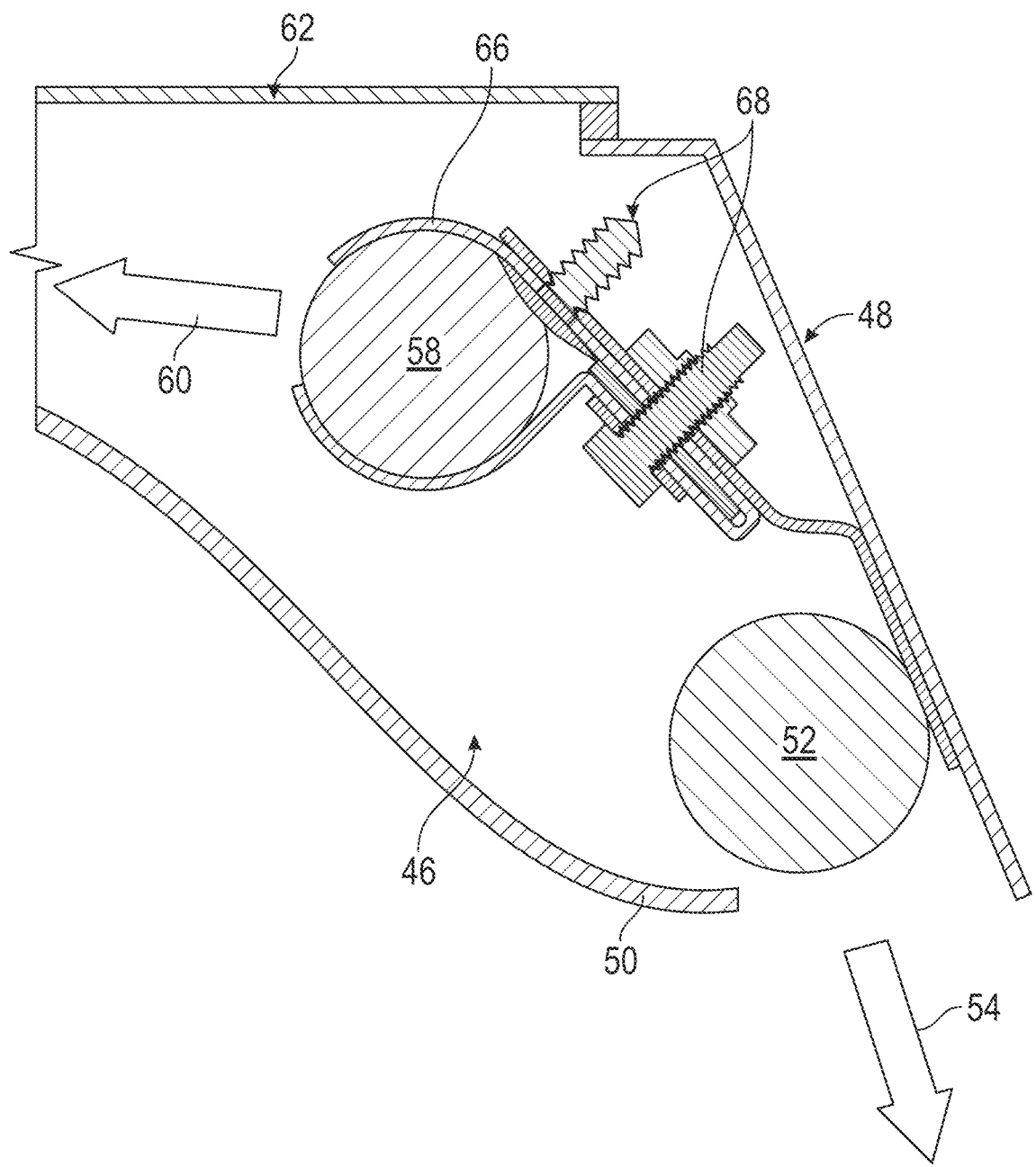
FIG. 3 is a partial cross-section view of an embodiment of a roof rail airbag system installed in a vehicle.

A cross-sectional view of an RRAB system 46 installed to a roof rail 48 is illustrated in FIG. 3. The RRAB system 46 is installed to the roof rail 48 and is positioned between the roof rail 48 and a headliner 50 of the vehicle 10. The RRAB system 46 includes a side cushion airbag 52, shown in its uninflated state in FIGS. 2 and 3. The side cushion airbag 52 is configured to extend in a side inflation direction 54 at least partially downwardly across a side window 56 of the vehicle 10 (shown in FIG. 2) to provide side protection to the head, neck and upper torso portions of the vehicle occupant. The RRAB system 46 further includes a roof cushion airbag 58, shown in its uninflated state in FIGS. 2 and 3. The roof cushion airbag 58 is configured to inflate in a roof inflation direction 60 different from the side inflation direction 54. The roof cushion airbag 58, when inflated, extends at least partially across a roof panel 62 of the vehicle 10 between the headliner 50 and the roof panel 62, which in some embodiments is a fixed glass roof panel 62. In some embodiments, the roof cushion airbag 58 extends in a width direction across between 25% and 85% of the roof panel 62.

The side cushion airbag 52 is retained to the roof rail 48 or other body 12 panel via a plurality of side cushion airbag brackets 64, while the roof cushion airbag 58 is similarly retained to the roof rail 48 or other body 12 panel via a plurality of roof cushion airbag brackets 66. Referring again to FIG. 2, the roof cushion airbag brackets 66 are spaced apart along a length of the roof cushion airbag 58, and the side cushion airbag brackets 64 are similarly spaced apart long a length of the side cushion airbag 52. The roof cushion airbag brackets 66 and the side cushion airbag brackets 64 are connected to the roof rail 48 via, for example, clips 68, push pins, bolts or the like.

The roof cushion airbag 58 and the side cushion airbag 52 are operably connected to and inflated by a common inflator 70 to inflate both the side cushion airbag 52 and the roof cushion airbag 58 at their respective selected inflation rates. In some embodiments, a first inflation rate of the roof cushion airbag 58 is different from a second inflation rate of the side cushion airbag 52. For example, in some embodiments, the RRAB system 46 is configured such that the second inflation rate of the side cushion airbag 52 is greater than the first inflation rate of the roof cushion airbag 58.

Figure 4:
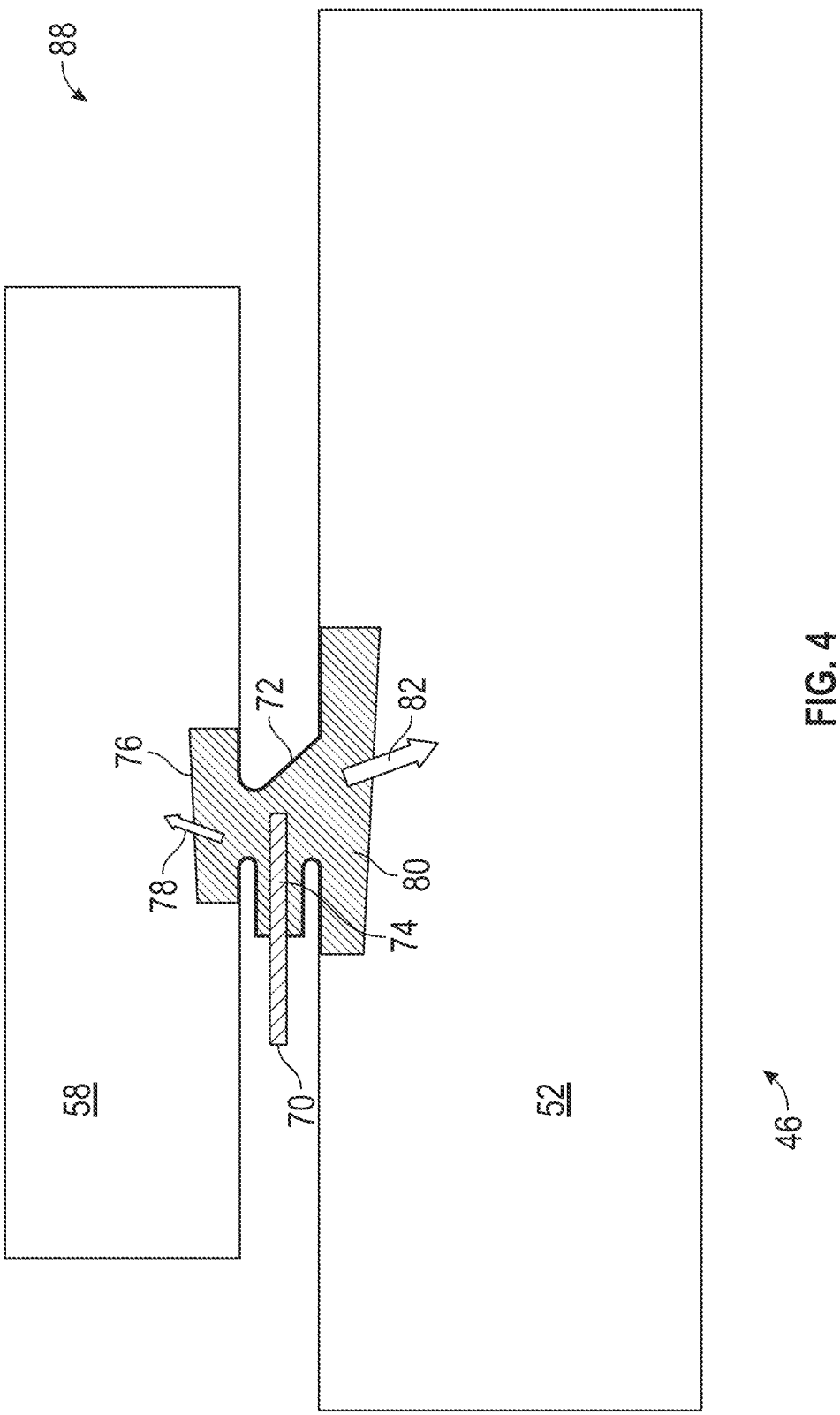
FIG. 4 is a plan view of an embodiment of a roof rail airbag system.

Referring to FIG. 4, the airflow from the inflator 70 to each of the roof cushion airbag 58 and the side cushion airbag 52 is controlled by a Y-valve 72. The Y-valve 72 includes an inlet opening 74 to accept airflow from the inflator 70. The Y-valve 72 further includes a first outlet 76 to direct a first airflow portion 78 into the roof cushion airbag 58 and a second outlet 80 to direct a second airflow portion 82 into the side cushion airbag 52. In some embodiments, a first cross-sectional size of the first outlet 76 is smaller than a second cross-sectional size of the second outlet 80 so that a greater amount of airflow is directed into that side cushion airbag 52 than into the roof cushion airbag 58, thus filling the side cushion airbag 52 before filling the roof cushion airbag 58. In one embodiment, such as illustrated in FIG. 4, the roof cushion airbag 58, the side cushion airbag 52 and the Y-valve 72 are formed together as a single unitary airbag assembly 88. This unitary airbag assembly 88 is connected to the inflator 70.

The RRAB system disclosed herein provides traditional side impact protection via the side cushion airbag 52 and also additional protection in the case of a rollover event via the roof cushion airbag 58. The inclusion of the Y-valve 72 allows for inflation of both the side cushion airbag 52 and the roof cushion airbag 58 via a common inflator 70, and in some embodiments may provide for inflation of the side cushion airbag 52 and the roof cushion airbag 58 at different inflation rates.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A roof rail airbag system of a vehicle, comprising:
   a side cushion airbag;
   a roof cushion airbag;
   an inflator operably connected to both the side cushion airbag and the roof cushion airbag and configured to inflate both the side cushion airbag and the roof cushion airbag; and
   a Y-valve to connect the inflator to the side cushion airbag and the roof cushion airbag, the Y-valve including:
   a first airflow outlet to direct a first airflow into the side cushion airbag; and
   a second airflow outlet to direct a second airflow into the roof cushion airbag;
   wherein a cross-sectional size of the first airflow outlet differs from a second cross-sectional size of the second airflow outlet such that the side cushion airbag is filled with the first airflow before the roof cushion airbag is filled with the second airflow.

2. The roof rail airbag system of claim 1, wherein the side cushion airbag, the roof cushion airbag and the Y-valve are formed together as a single unitary component.

3. The roof rail airbag system of claim 1, wherein the roof cushion airbag is configured, when inflated, to extend across a roof of the vehicle between a roof panel and a headliner of the vehicle.

4. The roof rail airbag system of claim 3, wherein the roof cushion airbag is configured, when inflated, to extend between 25% and 75% of a roof panel width across the roof panel.

5. The roof rail airbag system of claim 1, wherein the side cushion airbag is configured, when inflated, to extend across a side window of an occupant compartment of the vehicle.

6. The roof rail airbag system of claim 1, wherein the roof rail airbag system is configured to be secured to a roof rail of the vehicle.

7. A vehicle, comprising:
a vehicle body defining an occupant compartment; and
a roof rail airbag system secured to the vehicle body in the occupant compartment, the roof rail airbag system including:
  a side cushion airbag;
  a roof cushion airbag;
an inflator operably connected to both the side cushion airbag and the roof cushion airbag and configured to inflate both the side cushion airbag and the roof cushion airbag; and
a Y-valve to connect the inflator to the side cushion airbag and the roof cushion airbag, the Y-valve including:
  a first airflow outlet to direct a first airflow into the side cushion airbag; and
  a second airflow outlet to direct a second airflow into the roof cushion airbag;
wherein a cross-sectional size of the first airflow outlet differs from a second cross-sectional size of the second airflow outlet such that the side cushion airbag is filled with the first airflow before the roof cushion airbag is filled with the second airflow.

8. The vehicle of claim 7, wherein the side cushion airbag, the roof cushion airbag and the Y-valve are formed together as a single unitary component.

9. The vehicle of claim 7, wherein the roof cushion airbag is configured, when inflated, to extend across a roof of the vehicle between a roof panel and a headliner of the vehicle.

10. The vehicle of claim 9, wherein the roof cushion airbag is configured, when inflated, to extend between 25% and 75% of a roof panel width across the roof panel.

11. The vehicle of claim 7, wherein the side cushion airbag is configured, when inflated, to extend across a side window of an occupant compartment of the vehicle.

12. The vehicle of claim 7, wherein the roof rail airbag system is secured to a roof rail of the vehicle.

13. A method of operating a roof rail airbag system of a vehicle, comprising:
inflating a side cushion airbag of the roof rail airbag system via an inflator operably connected thereto; and
inflating a roof cushion airbag of the roof rail airbag system via the same inflator;
wherein the roof cushion airbag is configured, when inflated, to extend across a roof of the vehicle between a roof panel and a headliner of the vehicle; and
wherein the side cushion airbag is configured, when inflated, to extend across a side window of an occupant compartment of the vehicle;
wherein the inflator is operably connected to the side cushion airbag and the roof cushion airbag via a Y-valve; and
wherein a first inflation rate of the roof cushion airbag is different from a second inflation rate of the side cushion airbag, such that the side cushion airbag is filled before the roof cushion airbag is filled.

14. The method of claim 13, wherein the side cushion airbag, the roof cushion airbag and the Y-valve are formed together as a single unitary component.

* * * * *